Dec. 5, 1933.  T. A. KEEN  1,938,183
DOG STARTING APPARATUS
Filed May 14, 1931  3 Sheets-Sheet 2
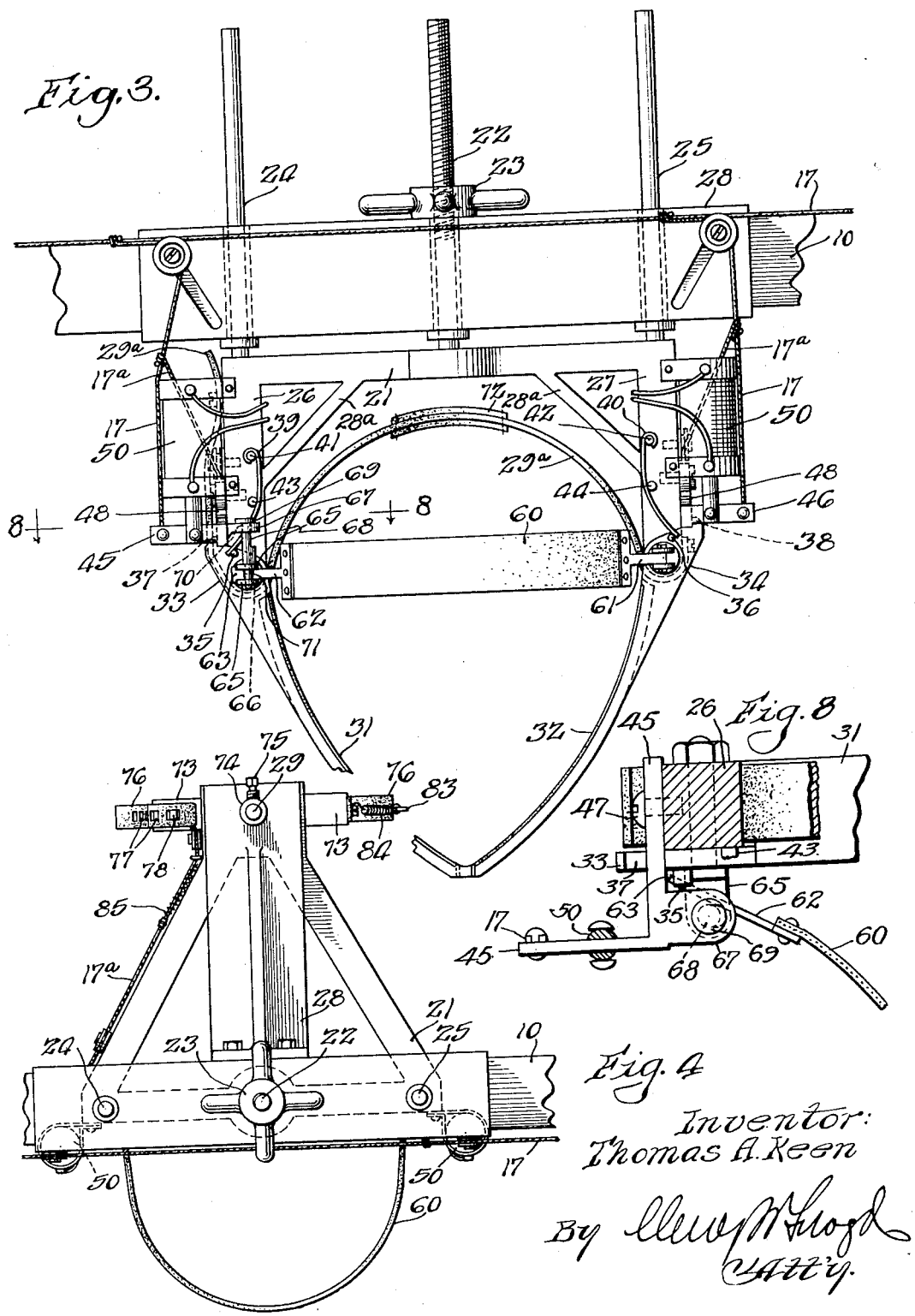

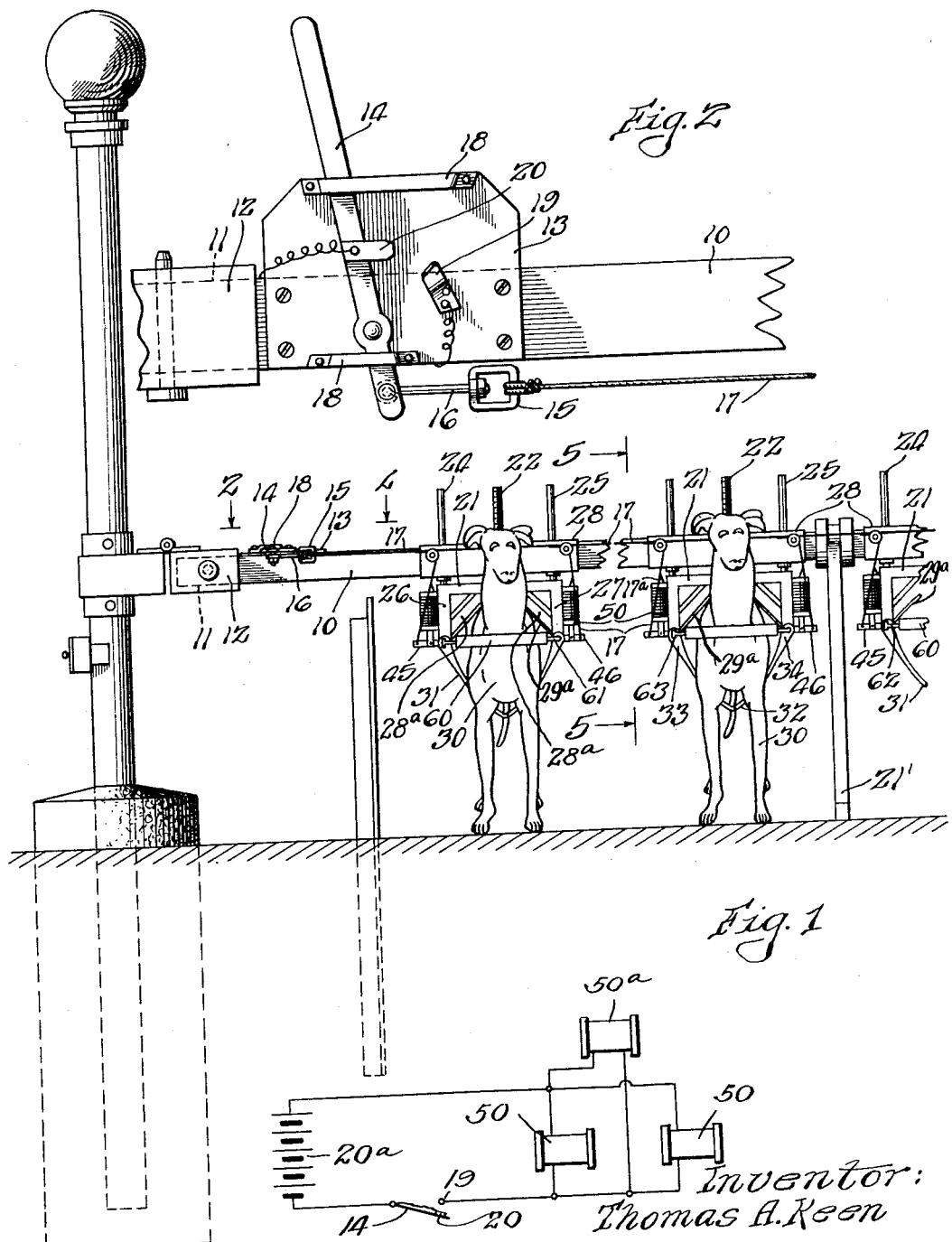

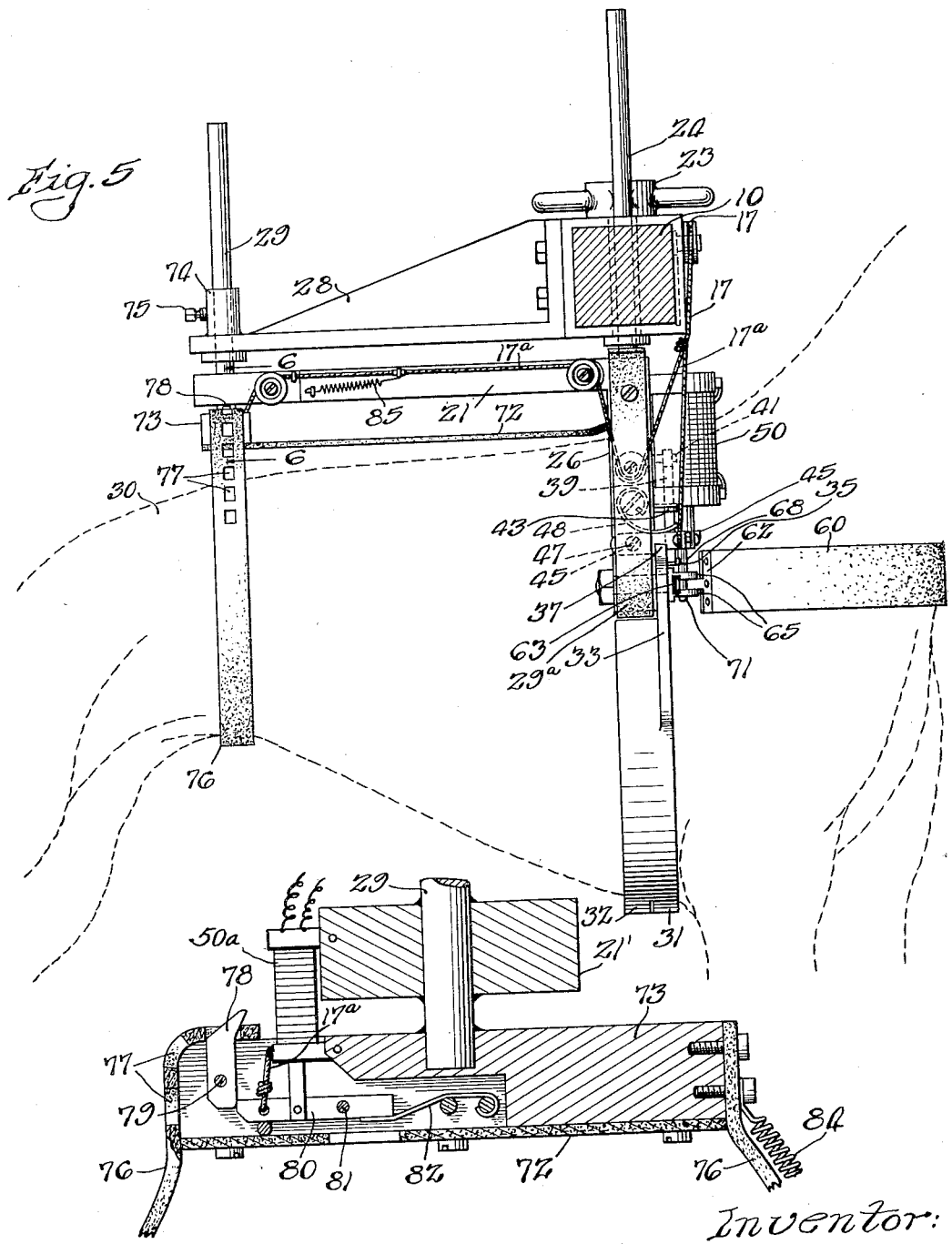

Patented Dec. 5, 1933

1,938,183

UNITED STATES PATENT OFFICE 1,938,183

DOG STARTING APPARATUS

Thomas A. Keen, St. Louis, Mo., assignor to Hannah M. Smith, River Forest, Ill.

Application May 14, 1931. Serial No. 537,323

14 Claims. (Cl. 119—15.5)

The present invention relates to dog starting apparatus and has particularly to do with a plurality of dog holding instrumentalities arranged upon a linear member used upon a track at a proper starting point, or permanently associated with one particular starting point.

In the present invention, there is at one side of a track a suitable post generally sunk into the ground for permanency. Thereon is a bracket provided with a hinge. To the free wing of the hinge is attached a socket. The linear member supporting the plurality of dog holding instrumentalities is secured to said socket member. Upon said linear member there may be arranged a plate for the purpose of providing electrical contacts and also for the purpose of providing a mounting for operating means.

The objects of the invention include new and improved means for holding dogs at the starting point of a race, new and improved means for releasing such dogs, and effective means for holding dogs both about the body and at the front thereof preparatory to releasing such dogs for racing purposes.

In the drawings:

Figure 1 is a front elevation of an apparatus embodying the invention, the middle section of the linear harness holding member being broken away;

Figure 2 is a fragmentary plan view of section of said linear member defined by the numerals 2—2 upon Figure 1;

Figure 3 is a front elevation of one of the dog holding members;

Figure 4 is a plan view of one of the holding members;

Figure 5 is a side elevation taken on the line 5—5 of Figure 1;

Figure 6 is a sectional detail of the rear strap holding member taken on the line 6—6 of Figure 5;

Figure 7 is a diagram of a circuit suitable for operating electrical releasing means; and Figure 8 is a plan view of the latch mechanism taken on the line 8—8 of Figure 3.

The linear member 10 in the present instance is generally square in cross section. There is at one end thereof a section 11 which is adapted to be inserted into the socket 12 heretofore described. Suitably bolted to the linear member 10 adjacent to that portion which is adapted to be inserted into the socket is a plate 13. Upon said plate is a pivoted lever 14, having one end extending beyond the margin of the plate 13, the other end having secured thereto by a pivotal connection, a link 15 terminating in an eye bolt 16 which is adapted to provide a connection for cable 17 employed in operating the device.

There may be upon said plate 13 a guide means 18 for limiting the arcuate movement of the lever 14 and there may also be provided on said plate and properly insulated therefrom, a contact 19 which may be connected with a starting apparatus release. Also upon the lever 14 and suitably insulated therefrom is a complemental contact 20 suitably connected to the same source of electromotive force as the first referred to contact. By the actuation of the lever 14, not only are the various instrumentalities holding the dogs released, but concurrently there may be established a circuit for starting a timing apparatus or the like. A diagram of the electrical circuit of the electrical release mechanism is shown in Figure 7, in which the source of electrical energy 20a supplies an electric current through the contacts 19 and 20 when the lever 14 is moved into the starting position, actuating the solenoids 50 and 50a. The solenoid 50a is omitted from Figure 5 for clarity.

At the end of the linear member 10 there may be a carpenter's horse or trestle 21' which is adapted to hold the free end thereof away from the ground so that the linear member 10, when in use, will have a substantially horizontal position. As soon as dogs are released therefrom, it is usual and customary to lift the linear member 10 with all the appurtenances thereon to a substantially vertical position out of the path of the dogs, using the hinge as a pivot for such movement.

Through said rectangular bar or lineal member 10 are a plurality of apertures. Each of the dog holding instrumentalities requires three apertures, two for guide rods and a third for an adjusting member. On the under side of said boom or linear member is a triangular yoke 21 and secured therein is the end of a central member 22 which has operating theron a handwheel 23. At the adjacent corners of said triangle 21 are guide rods 24 and 25 which are adapted to project through the apertures in linear member 10 adjacent to said center rod 22. The yoke 21 is thus prevented from being moved angularly, and operation of the hand wheel 23 in one direction lowers the yoke and in the other direction raises it relatively to the linear member.

Depending downwardly from under said yoke are arms 26 and 27 to which jaws are attached. From the rear wall of the linear member 10 a bracket 28 extends, said bracket being adapted to be secured by machine screws or bolts or rivets to the linear member. It is generally triangular in configuration.

Through the rear end thereof is an aperture, and through said aperture a guide rod 29 is adapted to reciprocate, said guide rod being attached to the remaining apex of said triangular yoke 21. In this manner a three-cornered support is provided for the yoke 21 independently of the means for raising and lowering of threaded shaft 22.

Each of the downwardly depending legs 26 and 27 may have a reenforcing angular member 28a. Across said front section of said yoke 21 between legs 26 and 27 is a leather strap 29a which is adapted to rest upon the back of a dog 30. The strap is of sufficient flexibility to conform to the contour of the dog's back and it may be adjustable. Ordinarily, however, it is not necessary to make it adjustable. It is of such length that a dog 30, disposed thereunder, cannot come in contact with the metal portion of the yoke 21 or of its legs 26 and 27.

Complemental jaws 31 and 32 are pivoted at each side of yoke 21. Each of said jaws 31 and 32 has a projecting section 33 and 34 in which a bearing pin 35 and 36 is seated, the end of the section including a hooked portion 37 and 38 providing engagement for a latch.

Springs 39 and 40 are anchored upon the yoke 21 by suitable pins 41 and 42, with pressure pins 43 and 44 associated therewith. The springs 39 and 40 are of the flat type anchored about the pins 41 and 42 respectively engaging the pins 43 and 44 and resting at the free end upon the bearing pins 35 and 36 in the jaws 31 and 32. The force exerted upon said pins 35 and 36 is adapted to spring the jaws 31 and 32 outwardly.

At the side of said legs 26 and 27 are latch members 45 and 46 which are adapted to extend longitudinally of the device. Each latch is secured to the side of a leg 26 and 27 by a pivot pin 47. Thereabove is a partially coiled flat spring 48 the normal tendency of which is to urge the latch (45 or 46) downwardly into position to lock a jaw (31 or 32) by the extension thereon.

The outer surface of the extension 33 and 34 of said jaw is rounded so that when an effort is made to close a jaw 31 and 32, no resistance is met other than spring resistance. After the latch has been forced upwardly out of the way during the jaw closing operation, the jaws 31 and 32 will automaticaly be locked in closed position by the spring urged position of the latch which locking occurs when a jaw 31 or 32 has been moved inwardly a sufficient distance to allow the latch to drop back of the hook upon each jaw extension.

At each side of the device, the jaws 31 and 32 are similarly constructed, but reversed in position. A cable 17 is attached to the latch members 45 and 46 and runs over sheaves along the linear member to the actuating lever 14 heretofore mentioned.

An alternative operating means for said latch members 45 and 46 is provided in the form of a solenoid 50 disposed at the side of the yoke, one being connected to each of said latches 45 and 46. Energization of the solenoid 50 causes the latch 45 or 46 to be lifted upwardly whereby to release the jaws 31 and 32 in the same manner as when the cables 17 just described are employed.

Across the front of a dog 30 there is provided a check band. This comprises a leather band 60 having metallic reenforcements 61 and 62 at its ends. At the right hand side, Figure 1, the metallic reenforcement 61 for the strap 60 is pivotally secured to a suitable part of yoke 21 in such a manner that the strap 60 is adapted, when released at its other end, to move because of gravity and upon the urge of a dog, out of the dog's way, to hang downwardly.

At its other end, the metallic end piece 62 comprises the portion secured to the strap 60 and a T-shaped section 63. Reenforcing portion 62 is adapted to be inserted between two parallel blocks 65 having apertures 66 therethrough. The jaw releasing latch 46 on the left-hand side of Figure 1, has an inwardly directed extension 67. Disposed therethrough is a reciprocating pin 68 having a head 69 determining its lowermost position.

Said pin 68 is adapted to ride in an opening 70 in extension 67. The lower end of said pin 68 comprises a narrow wedge-like portion 71 which is adapted to bridge said parallel members 65 through said apertures 66 and to hold said T-shaped section 63 in position until released. As the pin 69 is pulled upwardly coincidentally with the release of the jaws 31 and 32, the front strap 60 is released at one end at the same time as the jaws 31 and 32 are opened, freeing the front end of a dog 30 at the same instant. The strap portion of the device will also be released when the latch mechanism is operated by solenoid 50.

The leather strap 29a across the front section of the device is extended rearwardly by a wide band of leather or the like 72 extending from said front strap 29a rearwardly away from the legs 27 and 26 of the yoke, and terminating beneath the rear section of the yoke upon a member 73 which is disposed at the lower end of rod 29 which projects through the rear aperture in the triangular yoke 21 and through the bracket 28.

Means for adjusting the height of member 29 are provided at the rear of the device and comprise a boss 74 through which a pin 75 is adapted to project. The member 29 supporting said rear latch is apertured at regular intervals to facilitate its adjustment in relation to said pin 75, said pin also being adapted to prevent axial displacement of said rear member.

The rear member 73 comprises a transverse piece at one end of which is disposed a leather strap 76 which is adapted to extend about the rear portion of the dog, just in front of his hind legs. This part of the device is not used in connection with all dogs for a great many do not require it, but is provided in order that it may be used when required.

Such strap 76 after being extended under a dog 30 is brought up over the end and top of said rear member 73. The end of said strap has a number of square or other suitable apertures 77 to engage in a hook member 78 which is pivoted at 79 in said rear member 73. A trigger 80 is supplied for said hook member 78.

Said trigger is pivoted at 81 and is urged downwardly by a spring 82 which is anchored in member 73. In its downmost position, said trigger 80 is adapted to hold said hook member 78 in position to maintain strap 76 in a hooked position. Upward movement of trigger 80 against the urge of said spring 82 by the use of a cable 17a permits of the release of said hook 78 when said trigger 80 shall have passed the horizontal plane of the pivot 79.

An alternative operating means for said trigger member 80 is provided in the form of a solenoid 50a disposed above said latch member and fastened to the transverse member 73 and the triangular rear member 21. Energization of the solenoid 50a concurrently with solenoids 50 causes the trigger 80 to move on its pivot 81, freeing the hook member 78 and releasing the strap 76.

The strain upon said strap 76 at such time hastens a quick release. To insure the strap turning away from a dog 30 quickly and being moved out of his way, strap 76 may have supplied thereon a spring hook 83 and said spring hook may have attached thereto a coil spring 84, the other end of which spring is anchored to a convenient part of the frame.

The cable 17a for the trigger 80 is adapted to run over a sheave at the back of the device forwardly and about other sheaves to join with the other cables at the front of the device, all of which cables are to be actuated from the end of the linear member 10 as heretofore described. A spring 85 may be attached to cable 17a in order to prevent any strain upon trigger 80 except when the lever 14 is manually actuated to pull said trigger 14 into a position which will permit of the release of the holding hook 78.

A plurality of similar units may be arranged upon the linear member 10. Each is independently adjustable of the others. All are operated conjointly by the lever 14. Adjustment of the individual frames may be had generally without change in the adjustment of the cables 17 and 17a, but when cable adjustments are necessary, turnbuckles intermediate the length of the cables or other means may be supplied to obtain desired adjustments.

I claim:

1. A dog starting apparatus comprising a linear member, a plurality of yokes having pairs of dog holding jaws thereon, latch means on said yokes and at the side of each of said jaws, a cable extending from each of said latch means, and a single lever for moving said cables to operate said latch means.

2. Dog starting apparatus comprising a frame with depending legs, a jaw on each leg of said frame and engaging a dog's body, means for urging said jaws apart, latch means for each jaw, and means for actuating said latch means.

3. Dog starting apparatus comprising a frame with depending legs, a jaw on each leg of said frame and engaging a dog's body, means for urging said jaws apart, a strap extending from one frame leg to the other frame leg, means for releasing said strap, latch means for each jaw, and means for actuating said latch means.

4. Dog starting apparatus comprising a frame with depending legs, a jaw on each leg of said frame, a strap from one frame leg to the other, latch means for each jaw, one of said latch means also securing said strap against displacement, and means for actuating said latch means.

5. A dog starting apparatus comprising a frame, legs depending from said frame, a jaw on each of said legs, latch means for securing said jaws about a dog's body, a strap across the front of the dog's shoulder from one of said legs to the other leg, and means on said latch means for releasing said strap.

6. A dog starting apparatus comprising a frame having legs, jaws on said legs and adapted to encircle a dog's body, a strap from one leg of said frame and extending in front of a dog to the other leg, means for holding said strap and said jaws, and a plurality of release means for rendering said holding means inoperative.

7. Dog starting apparatus comprising a frame having legs at its front and an extension at its rear, means at the front of said frame to hold a dog, a strap across said legs to rest upon a dog's back, said strap extending rearwardly under said extension, an adjustable member in said extension and anchoring said strap, a strap between the legs of said frame and releasably secured thereon to engage the shoulders of a dog, and a strap releasably secured to said adjustable member and extending about the body of a dog.

8. Dog starting apparatus comprising a frame having legs at its front and an extension at its rear, a strap across said legs to rest upon a dog's back, said strap extending rearwardly under said extension, an adjustable member in said extension and anchoring said strap, a strap between the legs of said frame and releasably secured thereon to engage the shoulders of a dog, a strap releasably secured to said adjustable member and extending about the body of a dog, and jaws on said legs adapted to encircle a dog's body between its front and rear legs.

9. Dog starting apparatus comprising a frame having legs at its front and an extension at its rear, a strap across said legs to rest upon a dog's back, said strap extending rearwardly under said extension, an adjustable member in said extension and anchoring said strap, a strap between the legs of said frame and releasably secured thereon to engage the shoulders of a dog, a strap releasably secured to said adjustable member and extending about the body of a dog, jaws on said legs adapted to encircle a dog's body between its front and rear legs, and means for simultaneously releasing said jaws and straps.

10. Dog starting apparatus comprising a frame having legs at its front and an extension at its rear, a strap across said legs to rest upon a dog's back, said strap extending rearwardly under said extension, an adjustable member in said extension and anchoring said strap, a strap between the legs of said frame and releasably secured thereon to engage the shoulders of a dog, a strap releasably secured to said adjustable member and extending about the body of a dog, jaws on said legs adapted to encircle a dog's body between its front and rear legs, and flexible means for simultaneously releasing said jaws and straps.

11. Dog starting apparatus comprising a linear member, a plurality of frames with legs, each frame having a rear extension on said linear member, a strap between said legs of the frame to engage the shoulders of a dog, jaws on said legs and adapted to encircle the dog's body, a rear member passing through said extension and having a strap extending about the dog's body, and means for releasing said jaws and straps of all the frames simultaneously.

12. Dog starting apparatus comprising a linear member, a plurality of frames with legs, each frame having a rear extension on said linear member, a strap between said legs of the frame to engage the shoulders of a dog, jaws on said legs and adapted to encircle the dog's body, a rear member passing through said extension and having a strap extending about the dog's body, and flexible means for releasing said jaws and straps of all the frames simultaneously.

13. Dog starting apparatus comprising a linear member, a plurality of frames with legs, vertically adjustable connecting means between said linear member and each of said frames, each frame having a rear extension on said linear member, a strap between said legs of the frame to engage the shoulders of a dog, jaws on said legs and adapted to encircle the dog's body, a rear member passing through said extension and having a strap extending about the dog's body, and means for releasing said jaws and straps of all the frames simultaneously.

14. Dog starting apparatus comprising a linear member, a plurality of frames with legs, vertically adjustable connecting means between said linear member and each of said frames, each frame having a rear extension on said linear member, a strap between said legs of the frame to engage the shoulders of a dog, jaws on said legs and adapted to encircle the dog's body, a rear member adjustable relative to said frame member and passing through said extension and having a strap extending about the dog's body, and means for releasing said jaws and straps of all the frames simultaneously.

THOMAS A. KEEN.